(12) United States Patent
Manser et al.

(10) Patent No.: US 6,388,660 B1
(45) Date of Patent: May 14, 2002

(54) INPUT PAD INTEGRATED WITH A TOUCH PAD

(75) Inventors: Brian E. Manser, North Sioux City; Robert J. Burnett, Dakota Dunes; Richard W. Griencewic, McCook Lake; James B. Stanek, Dakota Dunes, all of SD (US)

(73) Assignee: Gateway, Inc., N. Sioux City, SD (US)

( * ) Notice: Subject to any disclaimer, the term of this patent is extended or adjusted under 35 U.S.C. 154(b) by 0 days.

(21) Appl. No.: 09/001,798

(22) Filed: Dec. 31, 1997

(51) Int. Cl.[7] ............................................... G09G 5/00
(52) U.S. Cl. ........................................................ 345/173
(58) Field of Search ................................. 345/156, 157, 345/160, 173; 361/679, 680, 681, 683, 686

(56) References Cited

U.S. PATENT DOCUMENTS

| 4,092,527 | A | | 5/1978 | Luecke | 364/709 |
|---|---|---|---|---|---|
| 4,903,012 | A | * | 2/1990 | Ohuchi | 340/709 |
| 5,231,380 | A | * | 7/1993 | Logan | 340/706 |
| 5,341,154 | A | * | 8/1994 | Bird | 345/167 |
| 5,584,054 | A | * | 12/1996 | Tyneski et al. | 455/89 |
| 5,673,066 | A | * | 9/1997 | Toda et al. | 345/157 |
| 5,706,030 | A | * | 1/1998 | Ishigami et al. | 345/173 |
| 5,793,355 | A | * | 8/1998 | Youens | 345/156 |
| 5,982,358 | A | * | 11/1999 | Fleming, III | 345/168 |
| 6,003,052 | A | * | 12/1999 | Yamagata | 361/681 |
| 6,006,243 | A | * | 12/1999 | Karidis | 361/680 |
| 6,009,338 | A | * | 12/1999 | Iwata et al. | 455/575 |

OTHER PUBLICATIONS

Messmer, H., "The Indispensable PC Hardware Book—Your Hardware Questions Answered", Second Edition, Addison–Wesley Publishing Company , Cover page, Title page and Table of Contents (20 pgs)(1995).

* cited by examiner

*Primary Examiner*—Almis R. Jankus
(74) *Attorney, Agent, or Firm*—Kenneth J. Cool; Rodney L. Lacy; Schwegman Lundberg Woessner & Kluth

(57) ABSTRACT

An input pad that is integrated with a touch pad is disclosed. In one embodiment, a portable computer includes an input pad cover slidable from a first position approximately adjacent to the touch pad to a second position over the touch pad. In the first position the touch pad is operable as a pointing device; relative movement actuated on the pad causes a pointer on a screen of the computer to correspondingly move. In the second position the touch pad is operable as an input pad, preferably a numeric input pad; actuation of an absolute position within a given region on the pad registers the depression of a key corresponding to the region with the computer.

17 Claims, 10 Drawing Sheets

INPUT PAD INTEGRATED WITH A TOUCH PAD

FIELD OF THE INVENTION

This invention relates generally to an input pad, and more particularly to such an input pad that is integrated with a touch pad.

BACKGROUND OF THE INVENTION

Because numeric data is frequently entered into computers, most desktop computers are coupled to keyboards having a separate numeric input pad. Portable computers, such as laptop and notebook computers, usually do not have sufficient packaging space to include a separate numeric input pad on their keyboards. This means that entry of numeric data is potentially quite tedious.

To overcome this problem, portable computer designers have come up with a solution in which several of the alphabetic keys on the keyboard are mapped to numerals when a hot key on the keyboard is depressed to activate a numeric input pad mode. For example, the M, J, K, L, U, I and O keys are mapped to the numerals 0, 1, 2, 3, 4, 5 and 6, respectively. Combined with the 7, 8, and 9 keys, this remapping simulates a numeric input pad.

A disadvantage to this remapping is that it still does not promote quick entry of numeric data. A separate numeric input pad usually has its keys organized so that each key in a row of keys is directly aligned with a corresponding key of another row, whereas a typical computer keyboard usually has its keys organized so that each key in a row of keys is aligned in an offset fashion to a corresponding key of another row. When the offset keys are remapped to simulate a numeric input pad, this configuration poses a barrier to a touch typist quickly and accurately entering numeric data.

Another solution that portable computer designers have come up with is an external numeric input pad that plugs into an unused port on the back of the computer. However, this solution also is disadvantageous. Many portable computers are not equipped with ports that are amenable to these input pads. Furthermore, the numeric input pad adds to the bulk and weight a portable computer user must carry, and as a separate peripheral is potentially easily lost. The user may also take the computer to locations that are ill-suited for using an external input pad, because of the scarcity of space.

There is a need, therefore, for an input pad for a computer that overcomes these shortcomings. There is a need for an input pad that is not external to a computer which is portable. There is a further need for such an input pad that does not have keys organized in an offset fashion. That is, there is a need for an input pad for a computer that promotes quick entry of data.

SUMMARY OF THE INVENTION

The above-mentioned shortcomings and needs are addressed by the present invention, which will be understood by reading and studying the following specification. The present invention describes an input pad that is integrated with a touch pad. An input pad cover is slidable from a first position approximately adjacent to the touch pad to a second position over the touch pad. The touch pad is operable as a pointing device in the first position and as an input pad in the second position.

When the cover is positioned adjacent to the touch pad, relative movement on the touch pad is detected and transmitted to the computer to move a pointer on a screen of the computer a corresponding distance and direction. When the cover is positioned over the touch pad, specific regions on the touch pad are mapped to different keys. Pressing an area on the cover causes actuation of a corresponding region on the touch pad underneath the cover. This information is transmitted to the computer, which translates actuation of the region to depression of the key to which the region is mapped.

The invention thus provides a separate input pad that is not external to the computer. In the case of a portable computer embodiment having an integrated touch pad, the input pad cover is slidable from a position adjacent to the touch pad to a position over the touch pad. This provides an input pad amenable to quick and accurate entry of information. The input pad cover also preferably simulates a numeric input pad. Still other and further aspects, advantages and embodiments of the present invention will become apparent by reference to the drawings and by reading the following description.

DETAILED DESCRIPTION OF THE INVENTION

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the appended claims.

Figure 1A:
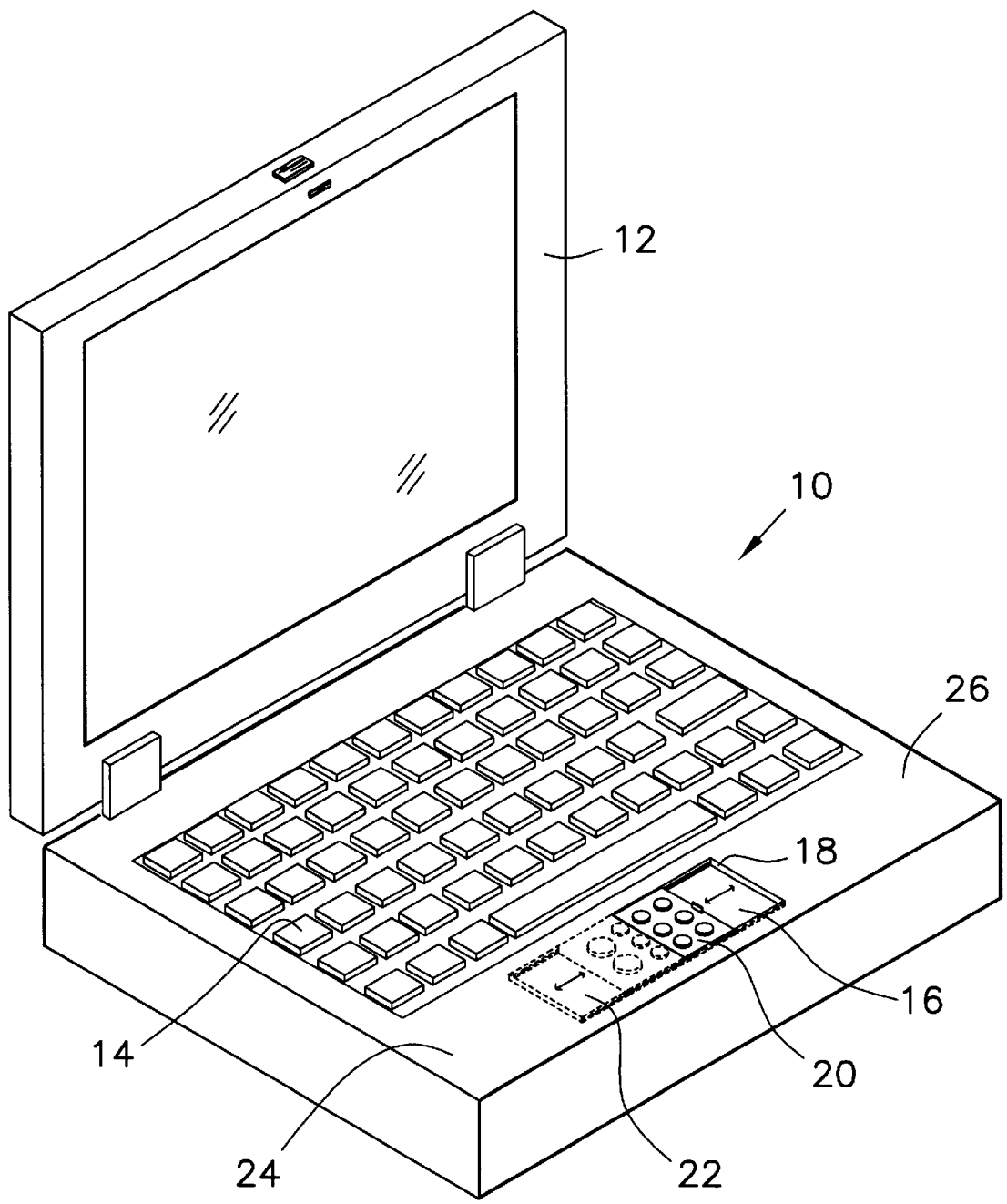
FIG. 1(a) shows a perspective view of a portable computer having an input pad integrated with a touch pad according to one embodiment of the invention.

Referring first to FIG. 1(a), a perspective view of a portable computer having an input pad integrated with a touch pad according to one embodiment of the invention is shown. As shown in FIG. 1(a), portable computer 10 includes display device 12 and keyboard 14 disposed within its housing. Display device 12 is a flat-panel display, such as a liquid crystal display (LCD). Not shown is that computer 10 also includes a processor (preferably an Intel Pentium processor), one or more storage devices (such as a hard disk drive (HDD), compact-disc read-only-memory (CD-ROM) drive, floppy disk drive (FDD), and a tape cartridge drive), and a memory. The memory preferably includes both random-access memory (RAM) and read-only memory (ROM). Preferably there is at least sixteen megabytes of RAM.

Portable computer 10 also includes touch pad 16 disposed within the bottom of cavity 18. Touch pad 16 is a resistive touch-sensitive pad that is able to detect actuation thereon. Furthermore, computer 10 includes input pad cover 20, which is slidable from a position within cavity 22 underneath top surface 24 to a position within cavity 18 over touch pad 16. That is, input pad cover 20 is slidable from a position approximately adjacent to touch pad 16. As shown in FIG. 1(a), input pad cover 20 is positioned such that a portion of cover 20 is disposed within cavity 22, and a portion of cover 20 is disposed within cavity 18. Portable computer 10 also top surface 26.

Input pad cover 20 is divided into regions, where each region is associated with (i.e., mapped to) a different function. In a preferred embodiment, cover 20 is a numeric input pad cover such that there is a separate region for each of the number keys (0-9), the mathematical operator keys (+,−,*,/), and an enter or=key. Each region is labeled to identify its associated key.

In a first configuration mode in which input pad cover 20 is positioned within cavity 22 approximately adjacent to touch pad 16 (i.e., input pad cover 20 is in a recessed position), touch pad 16 is completely exposed within cavity 18, and operates as a pointing device in a relative mode. Touch pad 16 transmits to computer 10 information regarding relative movement thereon (e.g., by a user of computer 10). The relative movement on touch pad 16 causes computer 10 to move a pointer on display device 12 a corresponding distance and direction, in the case where computer 10 is running an operating system having a graphical user interface, such as Microsoft Windows. Tapping on the pointing device is received at the computer as a mouse button click.

In a second configuration mode in which input pad cover 20 is positioned over touch pad 16 within cavity 18, touch pad 16 operates as a numeric input pad in an absolute mode, as a function of a driver program as described below. Touch pad 16 transmits to computer 10 the position thereon which has been actuated. This actuation results from an application of force on a region of cover 20 sufficient to actuate a corresponding underlying region of touch pad 16. Because cover 20 is divided into different key regions, actuation of touch pad 16 in this configuration mode causes computer 10 to translate the actuation into a key code corresponding to the region of cover 20 to which force has been applied. For example, a user applying force on a region of cover 20 labeled "9" (e.g., by pressing a finger against that region) sufficient to actuate a corresponding underlying region of touch pad 16 causes computer 10 to translate the actuation into a key code corresponding to the "9" key.

In a preferred embodiment of the invention, portable computer 10 is running a version of the Microsoft Windows operating system, such as Microsoft Windows 95 or NT. Portable computer 10 in this embodiment includes a pointing device driver, which is a software program executed by the processor from a memory or a storage device to interpret information received from touch pad. Pointing device drivers for computers capable of running Microsoft Windows are well known to those of ordinary skill in the art. U.S. patent application Ser. No. 08/724357, filed Oct. 1, 1996 and titled "Pointing Device with Control for Adjusting Sensitivity," provides a discussion of a mouse driver program. "The Indispensable PC Hardware Book," by Hans-Peter Messmer (2d ed. 1995, ISBN 0-201-87697-3) also provides information regarding pointing device drivers. Both of these references are incorporated herein by reference. In one embodiment, the driver of the invention is a modified pointing device driver such as those known to those skilled in the art to incorporate the dual functionality of the touch pad as has been described.

In the first configuration mode, the driver receives information from the touch pad regarding relative movement thereon, specifically, the distance and direction of that relative movement. This information is scaled appropriately by the driver, and sent to the operating system to correspondingly move a pointer on the display device. The driver therefore in the first configuration mode converts actuation of the touch pad to pointing device commands.

In the second configuration mode, the driver receives information from the touch pad regarding the exact position of the actuation thereon. The driver translates this information to a key code corresponding to the region of the touch pad that has been actuated, and sends a message event to the keyboard kernel of the operating system to simulate an actual key on the keyboard having been pressed. The driver therefore in the second configuration mode converts actuation of the touch pad to input pad key depressions. That is, the driver in response to receiving the actual position of actuation registers with the operating system that an associated key on the keyboard has been pressed.

Still referring to FIG. 1(a), in a preferred embodiment, when input pad cover 20 is positioned completely in cavity 18, touch pad 16 sends a request to the driver that pad 16 be switched to the absolute mode (i.e., the second configuration mode). In response, the driver sends a command to switch pad 16 to the absolute mode. Also in the preferred embodiment, when cover 20 is not positioned completely in cavity 18, touch pad 16 sends a request to the driver that pad 16 be switched to the relative mode (i.e., the first configuration mode). In response, the driver sends a command to switch pad 16 to the relative mode.

Figure 1B:
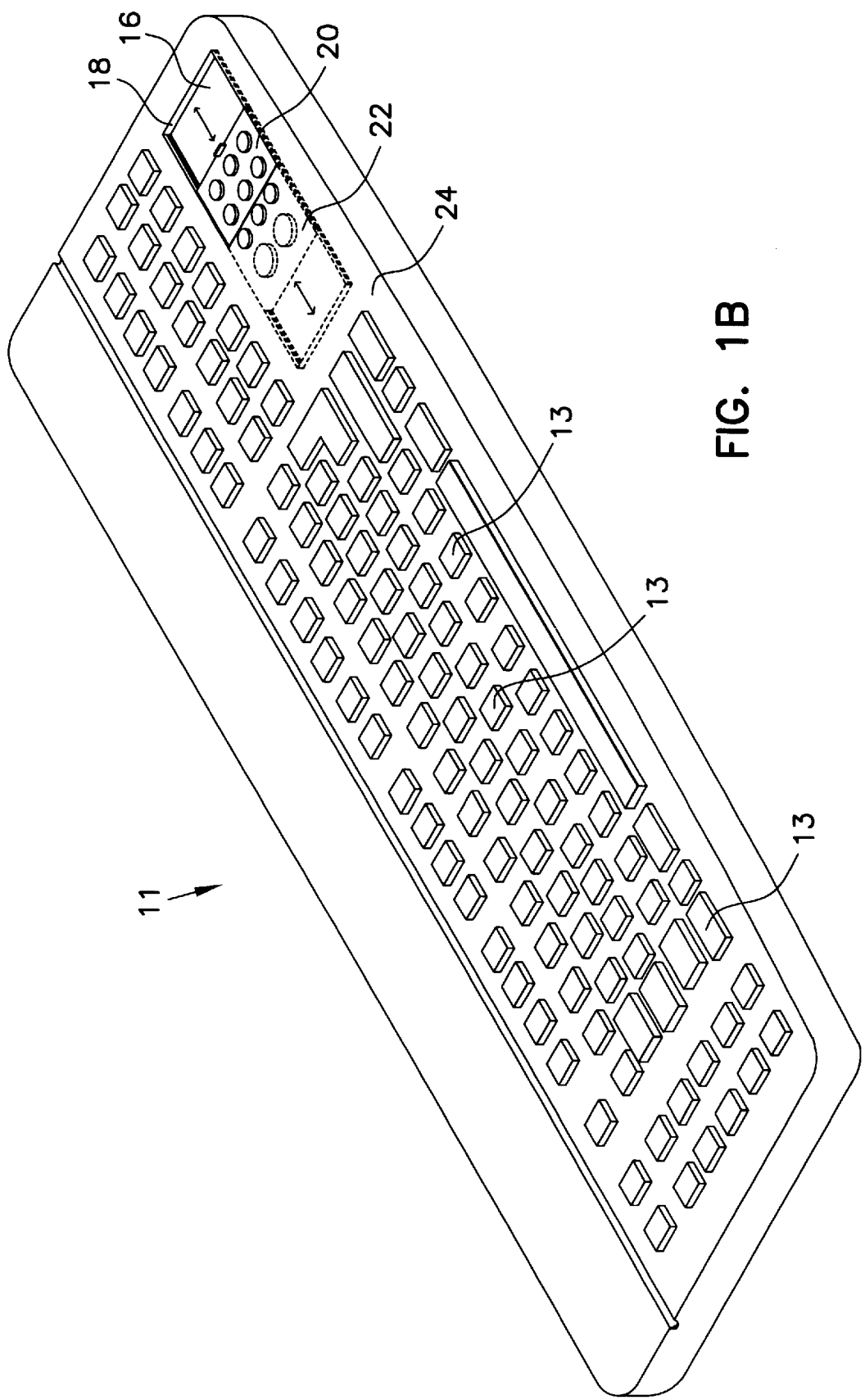
FIG. 1(b) shows a perspective view of a keyboard having an input pad integrated with a touch pad according to one embodiment of the invention.

Referring next to FIG. 1(b), a perspective view of a computer keyboard having an input pad integrated with a touch pad according to one embodiment of the invention is shown. Keyboard 11 includes a plurality of keys 13. Keyboard 11 also includes in the bottom-right corner touch pad 16 disposed within the bottom of cavity 18, and input pad cover 20, which is slidable from a position within cavity 22 underneath surface 24 to a position within cavity 18 over touch pad 16. As shown in FIG. 1(b), input pad cover 20 is positioned such that a portion of cover 20 is disposed within cavity 22, and a portion of cover 20 is disposed within cavity 18.

The operation of input pad cover 20 from a position within cavity 22 underneath surface 24 to a position within cavity 18 over touch pad 16 in FIG. 1(b) is identical to that as described in conjunction with FIG. 1(a). The difference between FIG. 1(b) and FIG. 1(a) is only that the embodiment of the invention of FIG. 1(b) is shown implemented within a computer keyboard, while the embodiment of the invention of FIG. 1(a) is shown implemented within a portable computer. FIG. 1(b) is thus meant to illustrate that the invention is not limited to implementation within a portable computer; it may also be implemented within a computer keyboard as shown in FIG. 1(b), or any other suitable device.

Figure 2:
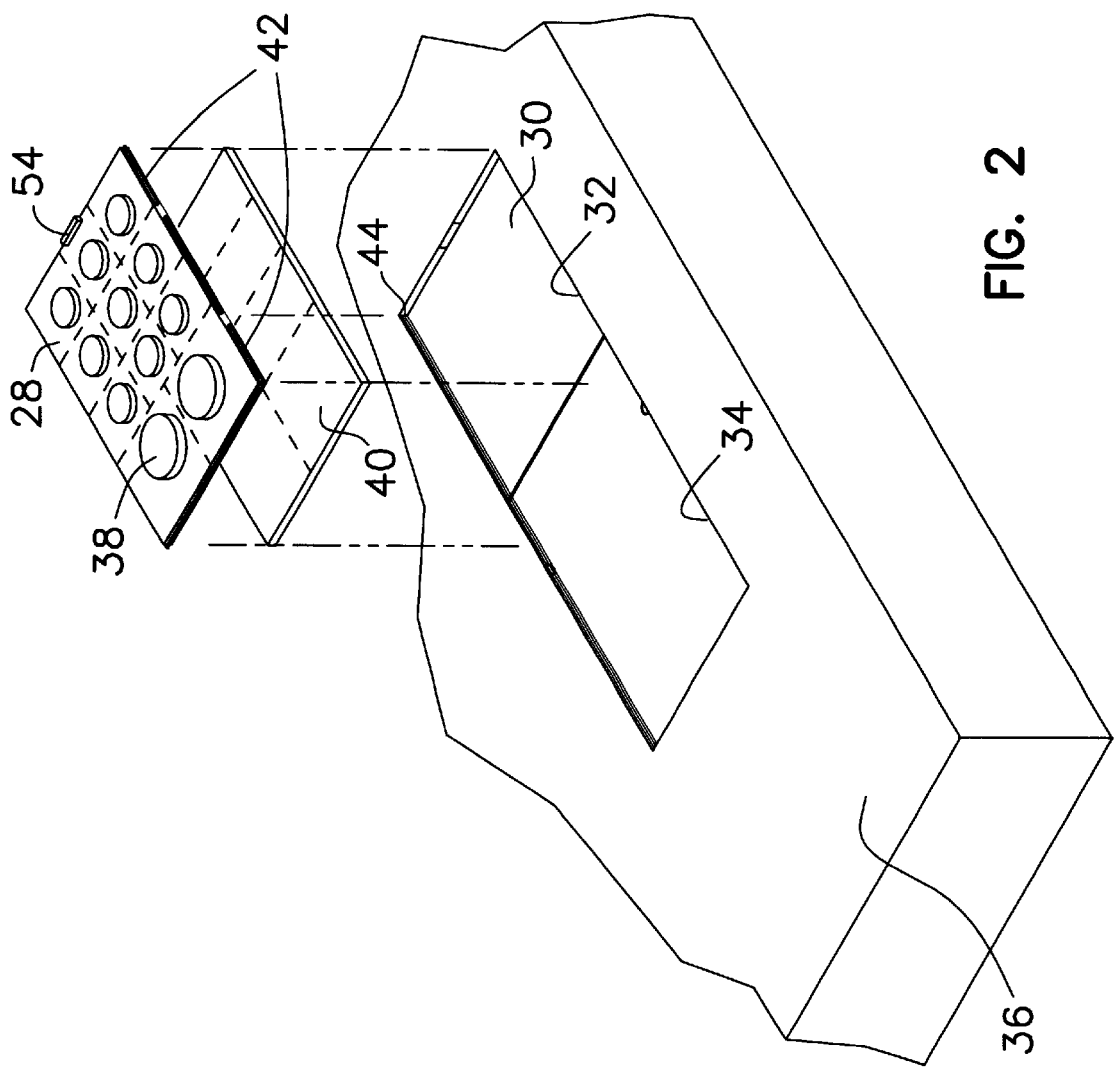
FIG. 2 shows a perspective view illustrating how an input pad cover is disposed within a portable computer according to one embodiment of the invention.

Referring now to FIG. 2, a perspective view illustrating how an input pad cover is disposed within a portable computer according to one embodiment of the invention is shown. Input pad cover 28 fits into cavity 32 over touch pad 30 such that it is slidable between and within cavity 32 and cavity 34, which is hidden underneath top surface 36. The elements of FIG. 2 just described correspond to their counterparts of FIG. 1(a), and reference should be made to the discussion in conjunction with FIG. 2 for further understanding thereto.

Input pad cover 28 is manufactured from a thin and pliable sheet material, such as plastic mylar. As shown in FIG. 2, cover 28 includes plurality of regions 38. Regions 38 include a region for each of a desired number of keys. Touch pad 30 is also divided into a plurality of regions 40 that correspond to regions 38. Regions 40 are demarcated in FIG. 2 by dotted lines. As has been already described in conjunction with FIG. 1(a), an application of sufficient force on a region 38 of input pad cover 28 causes actuation of the underlying corresponding region 40 of touch pad 30, when input pad cover 28 is completely within cavity 32.

Input pad cover 28 also includes ridges 42 running the length of the front and back bottom edges of the cover. Ridges 42 fit into corresponding slots 44, only one of which is shown in FIG. 2. Ridges 42 prevent cover 28 from coming loose when it is completely within cavity 32. Ridges 42 also promote slidability of cover 28 between cavity 32 and cavity 34. Input pad cover 28 also includes handle 54 so that a user may use a fingernail to more easily slide cover 28.

Figure 3A:
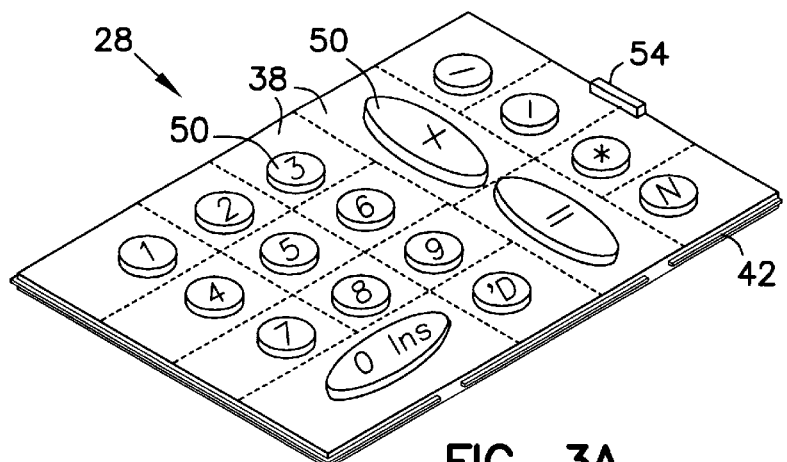
FIG. 3(a) shows the input pad cover of FIG. 2 in more detail, according to one embodiment of the invention.

Referring now to FIG. 3(a), the input pad cover of FIG. 2 is shown in more detail, according to one embodiment of the invention. Keyboard cover 28 has ridges 42 on its front and back bottom edges, as well as handle 54, as have been previously described. The input pad cover 28 of FIG. 3 shows that in one embodiment, each region 38 of cover 28 includes a blister button 50.

Blister button 50 is manufactured from a plastic material such that a bubble is formed on the top surface of cover 28. Blister button 50 provides a tactile feel and feedback to the regions of cover 28, to better simulate keys on an input pad. Furthermore, each blister button 50 preferably has labeled thereon the key(s) associated with the region for that button. Depression of a blister button 50 with a sufficient force causes a corresponding contact on the underside of the button (not shown in FIG. 3(a)) to actuate the resistive touch pad (also not shown in FIG. 3(a)) such that the depression of a key represented by the region of the blister button is registered with the computer. Note, however, that the presence of contact is preferred only, and not required.

As shown in FIG. 3(a), regions 38 and their corresponding buttons 50 includes regions and corresponding buttons for keys corresponding to N (for num lock), 1/end, 2/arrow down, 3/page down, 4/arrow left, 5, 6/arrow right, 7/home, 8/arrow up, 9/page up, and overside regions and corresponding oversized buttons for keys corresponding to 0/insert,=/ enter, and +. The dual key mappings of most regions (i.e., 4/arrow left, 7/home, etc.) is switchable in the same manner the dual key mappings of a numeric input pad of a standard keyboard for a computer is, by depressing num lock. That is, regions 38 and their corresponding buttons 50 are configured such that the input pad cover 28 comprises a numeric input pad overlay, and when the input pad cover 28 is positioned over the touch pad 30, the touch pad 30 is operable as a numeric input pad.

The numeric input pad configuration of the regions and their corresponding buttons as shown in FIG. 3(a) is not a limitation of the invention, however. The invention is amenable to any suitable configuration. For example, referring to FIG. 3(b), an input pad cover having a telephone key configuration is shown. Input pad cover 28 includes regions 38 and corresponding buttons 50 for keys corresponding to 1, 2, 3, 4, 5, 6, 7, 8, 9, *, and #, organized in a manner as commonly found on telephones. That is, regions 38 and their corresponding buttons 50 are configured such that the input pad cover 28 comprises a telephone input pad overlay, and when the input pad cover 28 is positioned over the touch pad 30, the touch pad 30 is operable as a telephone input pad. Input pad cover 28 of FIG. 3(b) also includes ridges 42 and handle 54, as have been previously described.

Figure 3B:
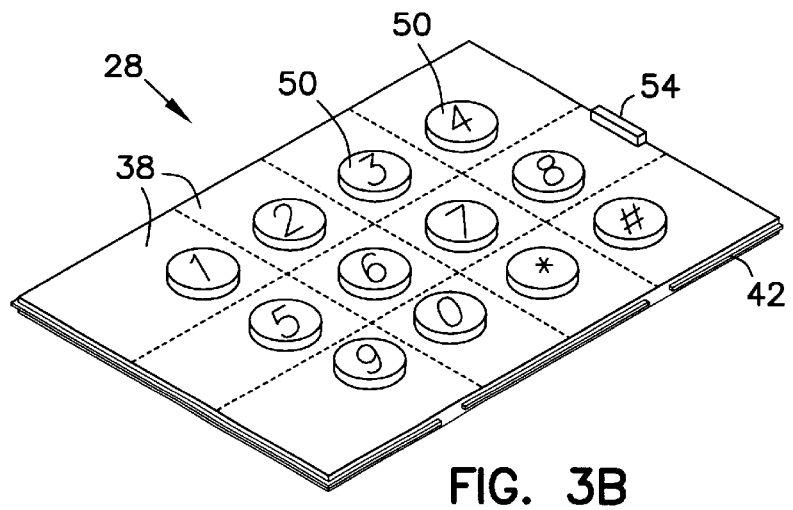
FIG. 3(b) shows the input pad cover of FIG. 2 in more detail, according to another embodiment of the invention.
Figure 3C:
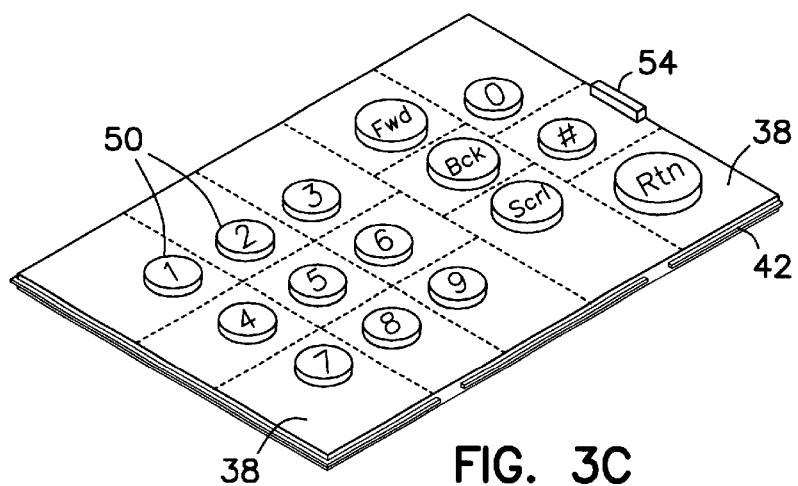
FIG. 3(c) shows the input pad cover of FIG. 2 in more detail, according to still another embodiment of the invention.

As a further example, referring to FIG. 3(c), an input pad cover having an Internet configuration is shown. Input pad cover 28 includes regions 38 and corresponding buttons 50 for keys corresponding to 1, 2, 3, 4, 5, 6, 7, 8, 9, 0, #, and return. Input pad cover 28 also includes regions 38 and corresponding buttons 50 for keys corresponding to a forward command, a back command, and a scroll command, as those commands are commonly found within Internet navigation software such as Netscape Navigator and Microsoft Internet Explorer. That is, regions 38 and their corresponding buttons 50 are configured such that the input pad cover 28 comprises an Internet input pad overlay, and when the input pad cover 28 is positioned over the touch pad 30, the touch pad 30 is operable as an Internet input pad. Actuation of the forward command instructs the software to display the next page in a series of world-wide web pages, while actuation of the back command instructs the software to display the previous page in a series of world-wide web pages, as known within the art. Actuation of the scroll command scrolls down the current world-wide web page, as also known within the art. Input pad cover 28 of FIG. 3(c) also includes ridges 42 and handle 54, as have been previously described.

Figure 4A:
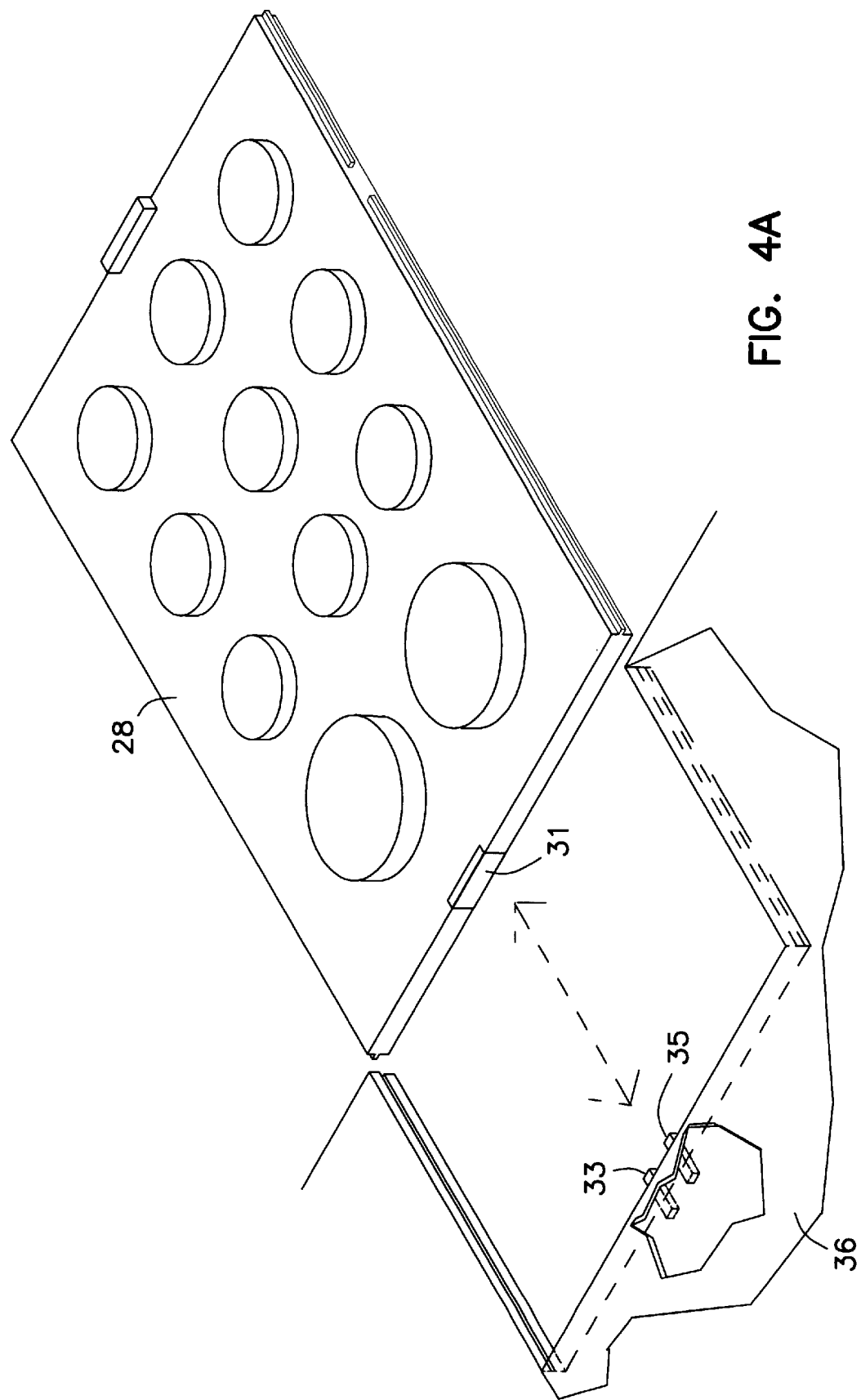
FIG. 4(a) shows a perspective view illustrating the manner by which detection of an input pad cover in its recessed position is accomplished according to one embodiment of the invention.
Figure 4B:
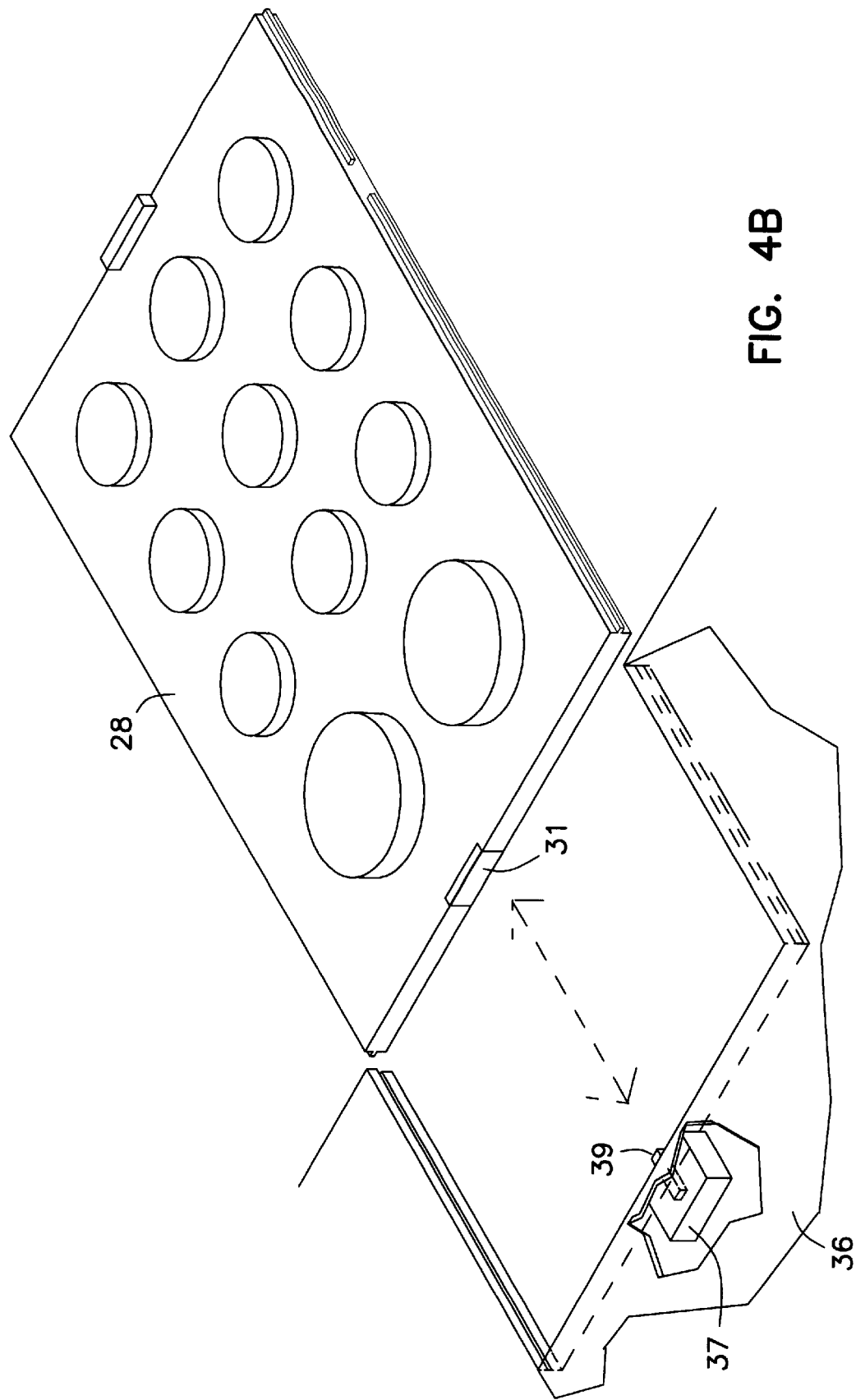
FIG. 4(b) shows a perspective view illustrating the manner by which detection of an input pad cover in its recessed position is accomplished according to another embodiment of the invention.
Figure 4C:
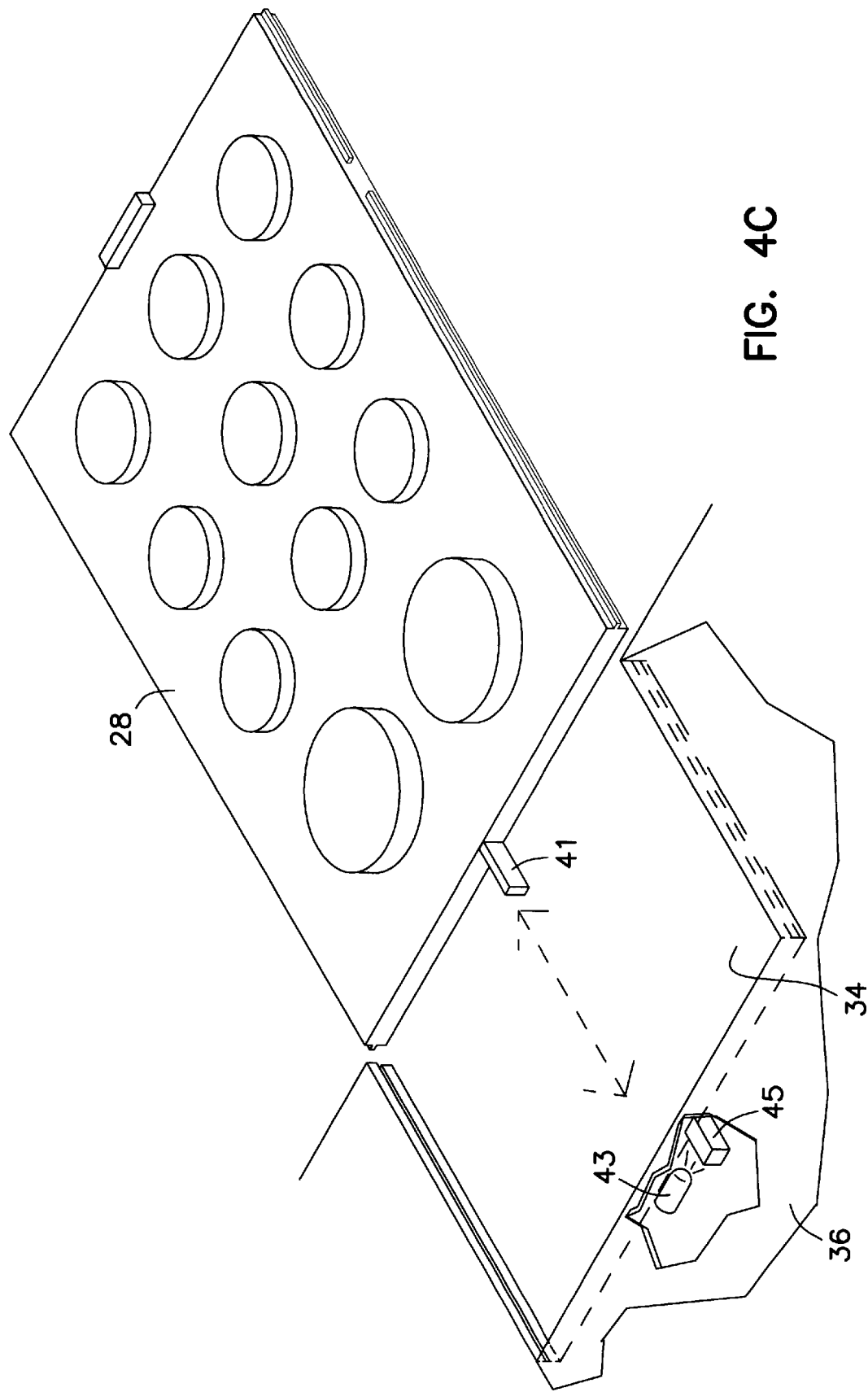
FIG. 4(c) shows a perspective view illustrating the manner by which detection of an input pad cover in its recessed position is accomplished according to still another embodiment of the invention.

The perspective views of FIG. 4(a), FIG. 4(b), and FIG. 4(c) shown manners by which detection of the input pad cover in its recessed position (i.e., not over the touch pad) is accomplished, according to differing embodiments of the invention. Such detection allows switching by the driver between the relative and the absolute modes in which the touch pad is operable. Referring first to FIG. 4(a), input pad cover 28 is slidable into a recessed position within cavity 34 underneath surface 36. Input pad cover 28 includes conductive surface 31 on its left edge. When cover 28 is completely slid into the recessed position within cavity 34 underneath surface 36, conductive surface 31 electrically connects conductors 33 and 35 located on an edge alongside the cavity, such that an electrical circuit is completed. The completion of this electrical circuit signals that input pad cover 28 has been completely slid into the recessed position within cavity 34, and thus is the manner by which detection of the input pad cover in its recessed position is accomplished according to the embodiment of FIG. 4(a).

Referring next to FIG. 4(b), input pad cover 28 is also slidable into a recessed position within cavity 34 underneath surface 36. When cover 28 is completely slid into the recessed position within cavity 34 underneath surface 36, cover 28 pushes against actuating member 39 of push-button switch 37 located on an edge alongside the cavity, such that it actuates switch 37. The actuation of switch 37 signals that input pad cover 28 has been completely slid into the recessed position within cavity 34, and thus is the manner by which detection of the input pad cover in its recessed position is accomplished according to the embodiment of FIG. 4(b).

Referring finally to FIG. 4(c), input pad cover 28 is also slidable into a recessed position within cavity 34 underneath surface 36. Input pad cover 28 includes opaque protruding member 41 on its left edge. Light-emitting diode (LED) 43 and sensor 45 are located on an edge alongside the cavity such that when cover 28 is not completely slid into the recessed position within cavity 34, sensor 45 is able to detect the light emitted by diode 43. However, when cover 28 is completely slid into the recessed position within cavity 34, opaque protruding member 41 is situated between diode 43 and sensor 45 such that the light emitting from diode 43 is blocked, and cannot be detected by sensor 45. The nondetection of the light emitted from diode 43 by sensor 45 signals that input pad cover 28 has been completely slid into the recessed position within cavity 34, and thus is the manner by which detection of the input pad cover in its recessed position is accomplished according to the embodiment of FIG. 4(c). The embodiment of FIG. 4(c) is preferred over those of FIG. 4(a) and FIG. 4(b).

Figure 5A:
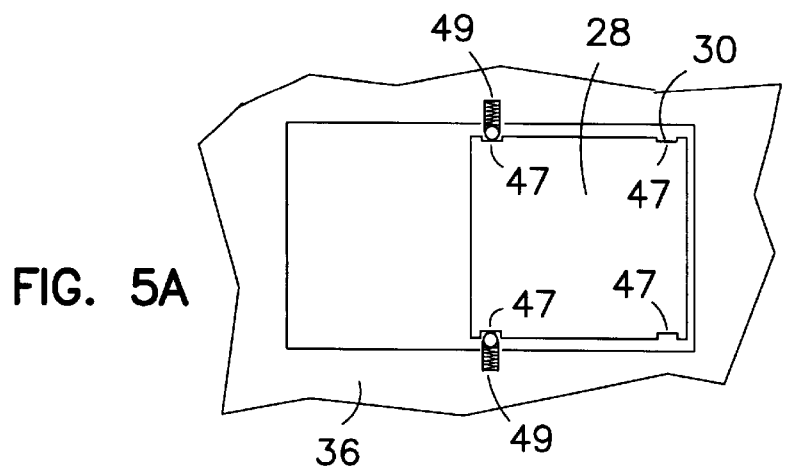
FIG. 5(a), FIG. 5(b), and FIG. 5(c) show top views illustrating a desirable mechanism to secure an input pad cover either in a second position either over a touch pad, or in a first position recessed within a cavity underneath a surface.
Figure 5B:
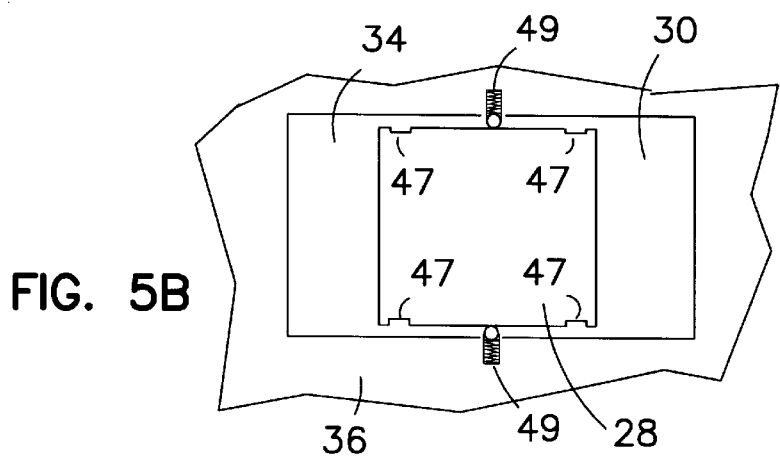
Figure 5C:
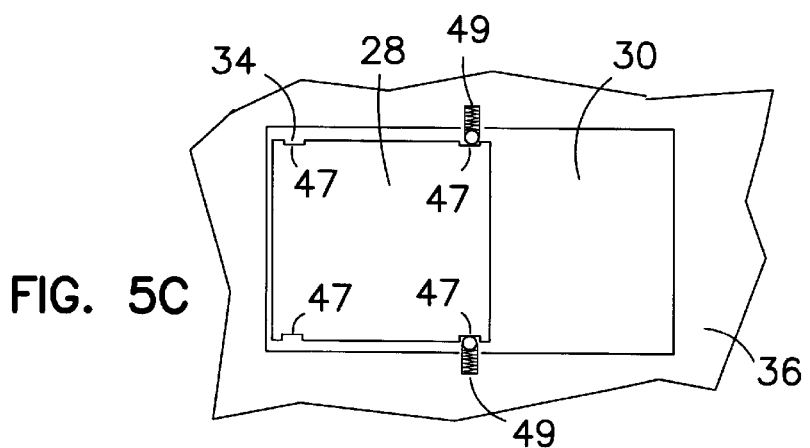

The top views of FIG. 5(a), FIG. 5(b), and FIG. 5(c) show a desirable mechanism to secure the input pad cover either in a second position over the touch pad, or in a first position recessed within a cavity underneath a surface. Referring first to FIG. 5(a), a first top view is shown in which input pad cover 28 is recessed within cavity 34 underneath top surface 36, in a first position corresponding to the first configuration mode previously described. Touch pad 30 is also shown. Input pad cover 28 includes two indents 47 at each end of its top edge, and two indents 47 at each end of its bottom edge. When input pad cover 28 is completely slid into cavity 34 underneath top surface 36 as is shown, one of indents 47 along its top edge and one of indents 47 along its bottom edge each aligns with a different one of two spring-loaded ball bearings 49 extending into cavity 34. Each spring-loaded ball bearing 49 fits into one of indents 47, such that input pad cover 28 is secured within cavity 36.

Because ball bearings 49 are spring loaded, however, input pad cover 28 may be still moved out of cavity 36 by pulling the cover out of the cavity with a force to overcome the force of the spring. This is shown by reference to FIG. 5(b), in which a second top view is shown in which input pad cover 28 is partially recessed within cavity 34 underneath surface 36, and partially over touch pad 30. That is, input pad cover 28 is not completely in the first position recessed within cavity 34, nor is it completely in the second position over touch pad 30. When input pad cover 28 is so situated, none of indents 47 are positioned such that spring-loaded ball bearings 49 fit within them, as is shown.

Once input pad cover 28 is moved completely into the second position, corresponding to the second configuration mode previously described, over touch pad 30, spring-loaded ball bearings 49 once again fit into two of indents 49. This is shown by reference to FIG. 5(c), in which a third top view is shown in which keyboard cover 28 is positioned completely over touch pad 30. In this second position, one of two indents 47 along the top edge of cover 28 and one of two indents 47 along the bottom edge of cover 28 each aligns with a different spring-loaded ball bearing 49. Note that the two indents 47 that each correspond to a different ball bearing 49 in FIG. 5(c) are not the same two indents 47 that each correspond to a different ball bearing 49 in FIG. 5(a). Each spring-loaded ball bearing 49 fits into one of indents 47, such that input pad cover 28 is secured in a position over touch pad 30. However, because ball bearings 49 are spring loaded, input pad cover 28 may be still moved into cavity 36 by pulling the cover out of the cavity with a force to overcome the force of the spring.

Figure 6:
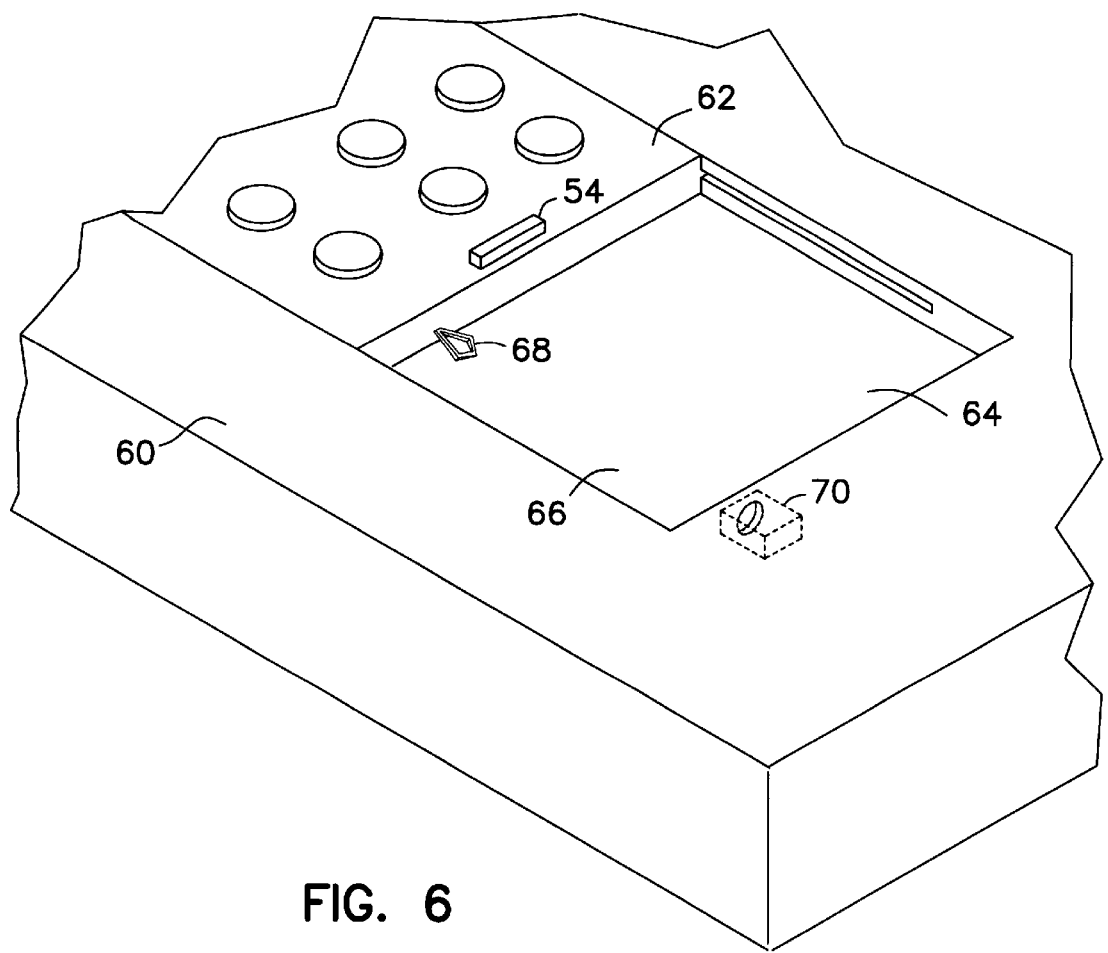
FIG. 6 shows a perspective view of an input pad cover partially slid over a touch pad of a portable computer, illustrating a locking mechanism of the input pad cover according to one embodiment of the invention; and, FIG. 7 shows a perspective view of a keyboard or portable computer having two input pad covers, one slidable from a cavity to the left of a touch pad and one slidable from a cavity to the right of the touch pad, according to one embodiment of the invention.

Referring now to FIG. 6, a perspective view of an input pad cover partially slid over a touch pad of a portable computer, illustrating a locking mechanism of the input pad cover according to one embodiment of the invention, is shown. Computer 60 as partially shown in FIG. 5 includes input pad cover 62 partially in cavity 64, at the bottom of which touch pad 66 is disposed. Computer 60, input pad cover 62, and cavity 64 all correspond to their counterparts of FIG. 1(a), and reference should be made to the description in conjunction with FIG. 1(a) for further understanding thereto. Input pad cover 62 also includes handle 54, as has been previously described. On the right side of input pad cover 62 is locking arm 68. Locking arm 68 is aligned with hole 70 on one side of cavity 64.

When input pad cover 62 is moved completely over touch pad 66 within cavity 64, locking arm 68 fits within hole 70 such that input pad cover 62 is locked firmly into place. To unlock cover 62, a sufficient force pushing cover 62 such that arm 68 is moved away from hole 70 is required. Thus, locking arm 68 and hole 70 are a locking mechanism. The locking mechanism prevents input pad cover 62 from sliding out of position when touch pad 66 is being used as an input pad device (i.e., in the absolute mode).

Figure 7:
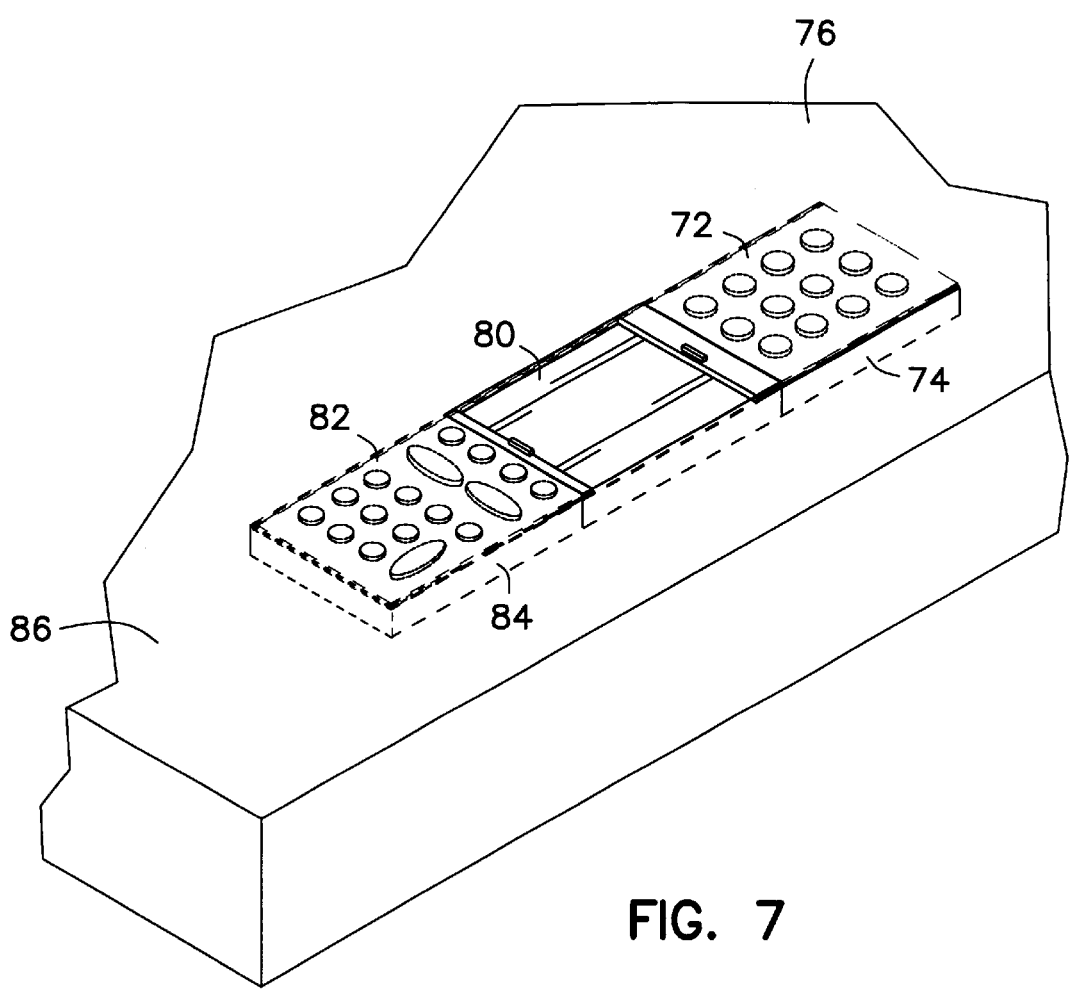

Referring to FIG. 7, a perspective view of an embodiment of the invention having two input pad covers, one slidable from a cavity to the left of a touch pad and one slidable from a cavity to the right of the touch pad, is shown. First input pad cover 72 is recessed within cavity 74, underneath a right top surface 76 of portable computer or keyboard 78. Input pad cover 72 is slidable from this recessed position to a position over touch pad 80. Second input pad cover 82 is recessed within cavity 84, underneath a left top surface 86 of portable computer or keyboard 78. Touch pad 80 is thus operable in a first (relative) mode in which neither input pad cover 72 nor input pad cover 82 is positioned over touch pad 80, in a second (absolute) mode in which input pad cover 72 is positioned over touch pad 80, and in a third (also absolute) mode in which input pad cover 82 is positioned over touch pad 80.

It is desirable to have two different input pad covers to allow for different functionality that can be provided by more than one input pad. For example, input pad cover 72 may have regions corresponding to the keys of a numeric input pad, as shown in FIG. 3(a), while input pad cover 82 may have regions corresponding to the keys of a telephone input pad, as shown in FIG. 3(b). Depending on the user's needs, either cover, or none of the covers, may be slid over the touch pad. That is, the user may use the touch pad as a pointing device, or may slide an input pad cover corresponding to a numeric input pad to use the touch pad as a numeric input pad, or may slide an input pad cover corresponding to a telephone input pad to use the touch pad as a telephone input pad.

The operation of the touch pad when a particular cover is slid over the touch pad conforms to the operation of a touch pad when only a single possible cover is slid over the touch pad as has been previously described. The only added complexity is to determine which of the two covers 72 and 82 has been positioned over touch pad 80. This may be accomplished by detecting which of the two covers is conversely still within its corresponding cavity, as previously shown in and described in conjunction with FIG. 4(*a*), FIG. 4(*b*), and FIG. 4(*c*). The operation of the touch pad when neither cover is slid over the touch pad also conforms to the operation of such an exposed touch pad as has also been previously described. Touch pad 80 is thus operable in three modes: a relative mode in which neither touch pad is positioned over the touch pad, a first absolute mode in which cover 72 is positioned over the touch pad, and a second absolute mode in which cover 82 is positioned over the touch pad.

As has been described, the present invention provides for a number of advantages. The input pad cover permits a touch pad of the computer to operate as an input pad as well as a pointing device. The resulting input pad is not an external device, and therefore no extra space, which frequently is at a premium, is required in order for it to be used. The input pad does not use a port of the computer. Because the regions of the input pad are organized preferably in a non-offset fashion, quick and accurate entry of information is also possible.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. For example, a specific sensor and a specific locking mechanism have been described herein. However, the invention is not so limited, and any sensor or locking mechanism is amenable to the invention, as those skilled in the art will appreciate.

For further example, the invention has been shown in relation to a host device which is a portable computer. Again, however, the invention is not so limited. A host device such as another type of computer, or a game pad device for a video game system, or a telephone device such as a phone, is also amenable to the invention, as those skilled in the art will appreciate. Therefore, it is manifestly intended that this invention be limited only by the following claims and equivalents thereof.

We claim:

1. A computer keyboard comprising:
   a housing;
   a touch-sensitive pad disposed within the housing; and,
   an input pad cover slidable from a first position approximately adjacent to the touch-sensitive pad to a second position over the touch-sensitive pad,
   wherein the touch-sensitive pad is operable as a pointing device when the cover is in the first position and as an input pad when the cover is in the second position.

2. The computer keyboard of claim 1, wherein the input pad cover comprises a numeric input pad overlay.

3. The computer keyboard of claim 1, wherein the input pad cover comprises a telephone input pad overlay.

4. The computer keyboard of claim 1, wherein the input pad cover comprises an Internet input pad overlay.

5. The computer keyboard of claim 1 further comprising a display device disposed within the housing distinct from the touch-sensitive pad.

6. The computer keyboard of claim 1, further comprising a locking mechanism disposed within the housing to secure the input pad cover.

7. The computer keyboard of claim 1, further comprising a plurality of spring-loaded members alignable with a plurality detents of the input pad cover to secure the input pad cover.

8. The computer keyboard of claim 1, further comprising a plurality of slots into which a plurality of ridges of the input pad cover are inserted to secure the cover.

9. The computer keyboard of claim 1, wherein the input pad cover includes a handle to promote sliding of the cover.

10. The computer keyboard of claim 1, further comprising a sensor coupled to the cover to detect when the cover is in the second position.

11. The computer keyboard of claim 1, further comprising a driver to convert actuation of the touch-sensitive pad to pointing device commands when the cover is in the first position and to input pad key depressions when the cover is in the second position.

12. The computer keyboard of claim 1, wherein the touch pad is divided into regions, each region associated with one of a plurality of keys of the input pad, actuation of a region registering depression of the associated key with the computer.

13. The computer keyboard of claim 1, wherein the cover includes a separate region for each of a plurality of keys of the input pad.

14. The computer keyboard of claim 13, wherein each separate region identifies the key of the input pad for the region.

15. The computer keyboard of claim 13, wherein each separate region includes a blister button, such that actuation of the blister button causes actuation of a region of the touch pad underneath the contact.

16. An input device for integration into a housing of a host device comprising a computer keyboard, the input device comprising:
   a touch-sensitive pad disposed within a surface of the housing;
   a first input pad cover slidable from a first position underneath the surface to a second position over the touch-sensitive pad;
   a second input pad cover slidable from a third position underneath the surface to the second position over the touch-sensitive pad,
   wherein the touch-sensitive pad is operable as a pointing device when the first input pad cover is in the first position and the second input pad cover is in the third position, as a first input pad when the first input pad cover is in the second position, and as a second input pad when the second input pad cover is in the second position.

17. A computer keyboard comprising:
   a housing;
   a touch-sensitive pad disposed within a surface of the housing;
   a first input pad cover slidable from a first position underneath the surface to a second position over the touch-sensitive pad;

a second input pad cover slidable from a third position underneath the surface to the second position over the touch-sensitive pad, wherein the touch-sensitive pad is operable as a pointing device when the first input pad cover is in the first position and the second input pad cover is in the third position, as a first input pad when the first input pad cover is in the second position, and as a second input pad when the second input pad cover is in the second position.

* * * * *